United States Patent [19]
Kempf et al.

[11] Patent Number: 5,694,809
[45] Date of Patent: Dec. 9, 1997

[54] DOUGH SHEET SENSOR

[75] Inventors: Thomas P. Kempf, Brooklyn Park; James L. Schurz, New Hope, both of Minn.

[73] Assignee: The Pillsbury Company, Minneapolis, Minn.

[21] Appl. No.: 560,177

[22] Filed: Nov. 17, 1995

[51] Int. Cl.$^6$ ...................................................... G01L 5/00
[52] U.S. Cl. ............................................... 73/169; 73/159
[58] Field of Search ............................... 73/1 J, 159, 169; 426/231

[56] References Cited

U.S. PATENT DOCUMENTS

| | | | |
|---|---|---|---|
| 2,323,818 | 7/1943 | Lessman | 73/159 |
| 2,340,067 | 1/1944 | Lessman | 73/159 |
| 4,674,310 | 6/1987 | Ginzburg | 73/159 |
| 5,209,939 | 5/1993 | Kempf | 426/231 |

OTHER PUBLICATIONS

Superprox® Proximity Sensor, brochure, Hyde Park Electronics, Inc. (1992).
Brochure, Superprox® Proximity Sensor with Analog Output, Models SM506A and SM556A, Hyde Park Electronics, Inc. (1992).

*Primary Examiner*—Ronald Biegel
*Attorney, Agent, or Firm*—Westman, Champlin & Kelly, P.A.

[57] ABSTRACT

A dough sheet sensor comprises a sensing roller, a pivot, a roller support arm and an adjustable counterweight. The sensing roller is displaceable in a first direction as a function of tension in a dough sheet. The roller support arm supports the sensing roller and is attached to the pivot. The adjustable counterweight is attached to the roller support arm and positioned opposite to the pivot with respect to the sensing roller for counterbalancing the sensing roller and the roller support arm. A non-contact distance sensor is operably coupled to the sensing roller through a measurement gap. The measurement gap has a length that varies with the sensing roller displacement.

20 Claims, 3 Drawing Sheets

DOUGH SHEET SENSOR

BACKGROUND OF THE INVENTION

The present invention relates to dough production line equipment. More specifically, the present invention relates to a dough sheet sensor for sensing tension in a dough sheet.

Dough sheet formers are widely used in production line equipment for the baking industry. A dough sheet former typically takes a quantity of dough, in the form of a ball or other mass, and forms a sheet from the mass of dough. Conventional dough sheet formers involve a number of rollers. The dough mass is conveyed through a plurality of sets of rollers, or back and forth through a single set of rollers, to flatten the dough and form the dough into a continuous sheet. The sheet, once formed, is commonly conveyed to other dough processing equipment for further processing. Such processing can include reduction of the dough, as well as cutting or shaping the dough.

Dough sheet formers and other production line equipment typically include one or more sensors which sense the tension in the dough sheet. The tension is a function of several variables within the production line, such as the speed at which the rollers transport the dough sheet, dough thickness, dough weight, dough elasticity, dough rheology, water content, batter mixtures and mixing speeds.

A conventional tension sensor is positioned within a gap between two dough support structures. The tension sensor includes a sensing roller positioned beneath the dough sheet within the gap such that the sensing roller rolls along a bottom surface of the dough sheet as the dough sheet passes over the gap. The sensing roller has an axle which rests within roller support arms at each end of the axle. The roller support arms are attached to pivots which allow the sensing roller and support arms to be displaced within the gap along an arc with respect to the pivot. The support arm is further attached to a fixed support structure through a counterbalancing spring.

As the dough sheet travels across the gap, the weight and elasticity of the dough allow the dough to "droop" within the gap and force the sensing roller downward. The displacement the sensing roller is counteracted by the spring. The amount of displacement is a function of the tension of the dough sheet and the spring constant.

A vertical measurement rod is attached to one of the roller support arms for measuring the vertical displacement of the sensing roller. The measurement rod includes a plurality of gear teeth which mate with a sprocket attached to a wiper arm of an electrical potentiometer. Vertical displacement of the measurement rod rotates the sprocket which changes the position of the wiper arm and thus the resistance of the potentiometer. The resistance can be measured by sensing a change in the current or voltage through the potentiometer. This measurement can then be used to perform various manual or automatic adjustments of the production line equipment, such as reducing the speed of the rollers or conveyors.

There are several difficulties associated with a conventional dough sheet tension sensor. First, the force exerted by a real spring exhibits non-Hookean behavior. As a result, the force becomes a non-linear function of the distance of stretching or compression of the spring. This creates difficulties in accurately analyzing the dough tension measurements. Second, the measurement rods and their associated gears, sprockets and potentiometers are susceptible to mechanical failures caused by wear and fatigue. For example, the gear teeth may not register properly within the sprocket after long periods of use. Also, the wiper arm within the potentiometer oscillates with the displacement of the sensing roller about a particular area on the potentiometer coils. Friction against the coils caused by the oscillation may cause the coils to wear and ultimately break. This would disable the tension measurement apparatus until the fault can be located and the potentiometer can be replaced.

SUMMARY OF THE INVENTION

The dough sheet sensor of the present invention comprises a sensing roller, a pivot, a roller support arm and an adjustable counterweight. The sensing roller is displaceable in a first direction in response to a dough sheet. The roller support arm supports the sensing roller and is attached to the pivot. The adjustable counterweight is attached to the roller support arm and positioned opposite to the pivot with respect to the sensing roller for counterbalancing the sensing roller and the roller support arm. A non-contact distance sensor is operably coupled to the sensing roller through a measurement gap. The measurement gap has a length that varies with the sensing roller displacement.

In one embodiment, the adjustable counterweight comprises a counterweight support arm and a counterweight mass. The counterweight support arm has a proximal end and distal end, with the proximal end being attached to the roller support arm. The counterweight mass is slidably connected along the counterweight support arm between the proximal and distal ends. A set screw extends through the counterweight mass and engages the counterweight support arm. When disengaged from the counterweight support arm, the counterweight can be moved up or down the counterweight support arm to a desired position. When the counterweight mass is in the desired position, the counterweight set screw is threaded into the counterweight mass to engage the counterweight support arm, thereby locking the counterweight mass in place.

The non-contact distance sensor comprises a distance measuring transducer and a target which are separated by the measurement gap. The target engages at least one of the sensing roller and the roller support arm such that displacements of the sensing roller and the sensing support arm in the first direction displace the target in the first direction and thus change the gap length. In one embodiment, the distance measuring transducer comprises an ultrasonic transducer which measures the gap length by reflecting ultrasonic signals off of the target. The travel time of the signals to and from the target is a function of the length of the gap and thus the dough sheet tension.

DETAILED DESCRIPTION OF THE PREFERRED EMBODIMENTS

Figure 1:
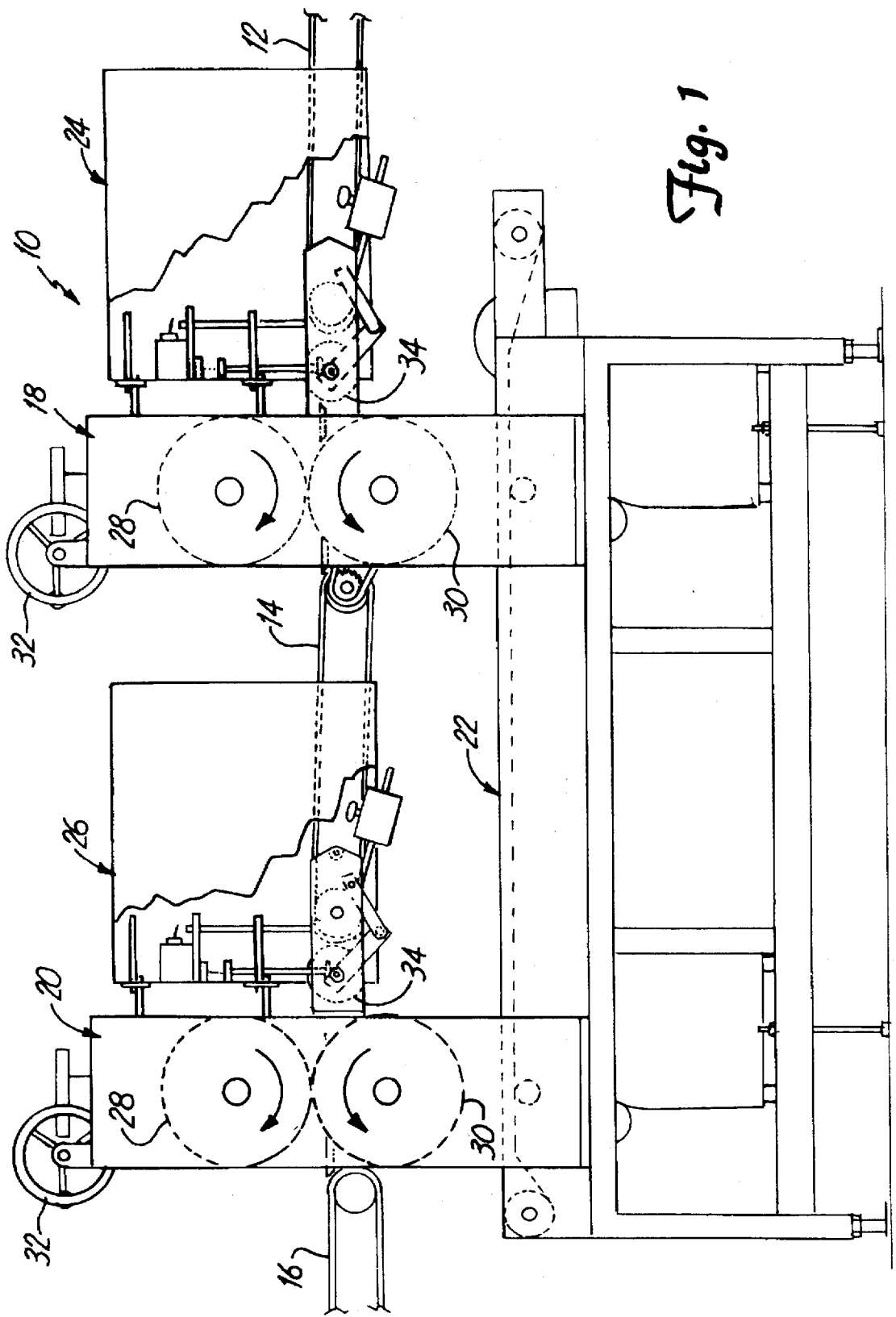
FIG. 1 is a partial side elevation view of production line equipment having dough sheet tension sensors in accordance with the present invention.

FIG. 1 illustrates production line equipment which incorporates two dough sheet sensors in accordance with the present invention. Production line equipment 10 includes conveyors 12, 14 and 16, pinch roller stands 18 and 20, flour catcher conveyor 22, and dough sheet sensors 24 and 26. Conveyors 12, 14 and 16 transport a continuous dough sheet (not shown) along the production line equipment from right to left in the figure.

Pinch roll stands 18 and 20 are positioned between conveyors 12, 14 and 16. Each pinch roll stand includes a pair of counter rotating pinch rollers 28 and 30 which are separated by a small gap. The gap is set by adjusting wheel 32. The dough sheet carried by conveyors 12, 14 and 16 travels between pinch rollers 28 and 30 which compress the dough sheet to a desired thickness. Pinch roll stands 18 and 20 are known in the art.

The dough sheet is typically dusted with flour to prevent the dough sheet from sticking to the various elements of production line equipment 10. As the dough sheet travels through production line equipment 10, a portion of the flour drops from the dough sheet. Flour catcher conveyor 22 catches and collects the flour for further handling in a known manner.

Sensors 24 and 26 are positioned along production line equipment 10. Sensors 24 and 26 measure the tension of the dough sheet as a function of the vertical displacement of a sensing roller 34. Sensing roller 34 of sensor 24 is positioned within a gap between conveyor 12 and pinch roll stand 18. As the dough sheet travels over the gap, the dough sheet "droops" within the gap as a function of the tension of the dough sheet. The amount of droop varies the vertical displacement of sensing roller 34. The greater the droop, the greater the displacement. The amount of vertical displacement is then measured, which is an indication of the tension in the dough sheet. The measurement can be used to automatically or manually adjust the production line equipment 10 to correct any irregularities in the dough sheet or in the equipment settings.

Figure 2:
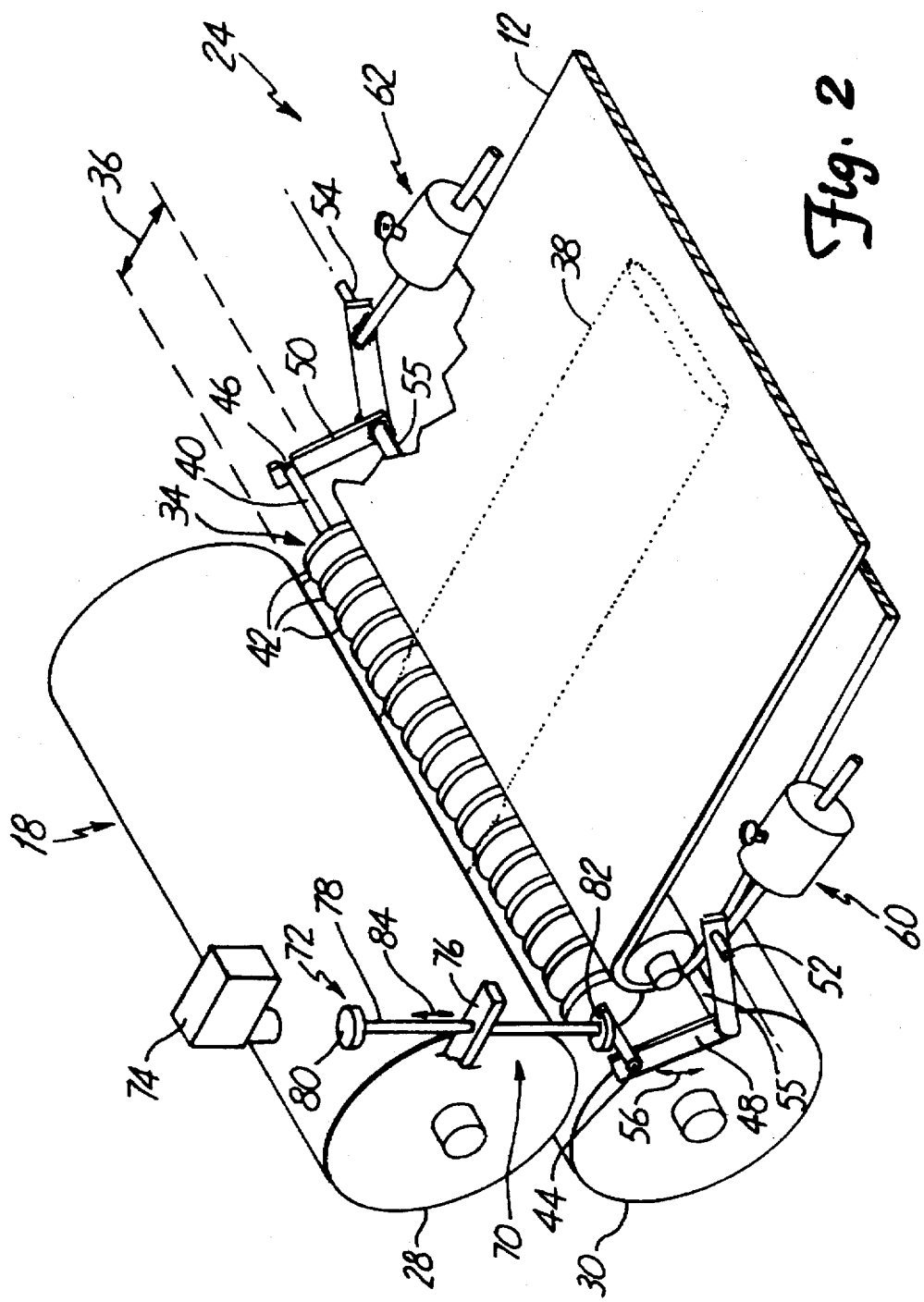
FIG. 2 is a fragmentary perspective view of the production line equipment shown in FIG. 1, which illustrates the dough sheet tension sensor.

FIG. 2 is a partial perspective view of dough sheet sensor 24 and pinch roll stand 18. Conveyor 12 is separated from pinch rollers 28 and 30 by a gap 36. Sensing roller 34 is positioned within gap 36 for sensing the vertical displacement of dough sheet 38. Sensing roller 34 includes an axle 40 which carries a plurality of disks 42 having equal diameters. Axle 40 has a first end 44 and a second end 46 which are journaled within sensing roller support arms 48 and 50, respectively, for free rotation as dough sheet 38 travels over disks 42. Sensing roller support arms and 50 are pivotally attached to pivots 52 and 54, respectively, and are connected together through an interconnect rod 55. Pivots 52 and 54 are secured to a support structure (not shown) of production line equipment 10. Sensing roller 34 and sensing roller support arms 48 and 50 pivot along arc 56 with respect to pivots 52 and 54.

Adjustable counterweights or pivot balancers 60 and 62 are attached to roller support arms 48 and 50, respectively. Counterweights 60 and 62 are positioned opposite to pivots 52 and 54 with respect to sensing roller 34 for counterbalancing the sensing roller mass and the sensing roller support arm mass about pivots 52 and 54. A roller displacement sensor 70 senses the vertical displacement of sensing roller 34. Sensor 70 includes a target 72, a distance measuring transducer 74 and a guide support 76. Target 72 includes a guide shaft 78, a target surface 80 and a displacement surface 82. Guide shaft 78 extends through guide support 76 and engages sensing roller 34 at displacement surface 82. The vertical displacement of sensing roller 34 causes a vertical displacement 84 of guide shaft 78 and target surface 80. Distance measuring transducer 74 measures the displacement of target surface 80 by measuring the length of a measurement gap between transducer 74 and target surface 80.

Figure 3:
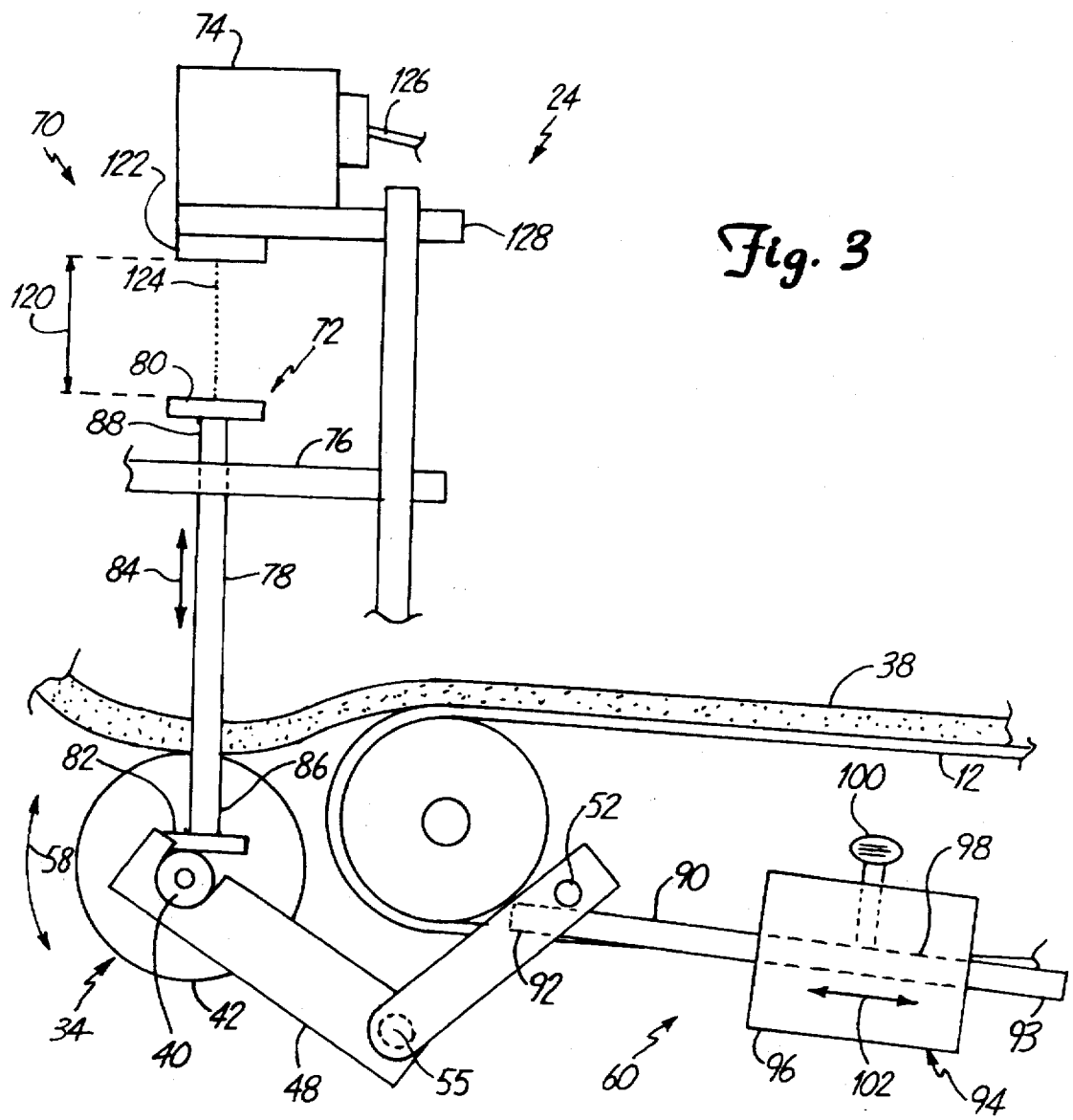
FIG. 3 is an enlarged side elevation view of the dough sheet tension sensor shown in FIGS. 1 and 2.

FIG. 3 is an enlarged side elevation view of dough sheet sensor 30. FIG. 3 illustrates adjustable counterweight 60 in greater detail. Adjustable counterweight 60 includes a counterweight support arm 90 having a proximal end 92 and a distal end 93. Proximal end 92 is attached to sensing roller support arm 48. A counterweight mass 94 is slidably connected to counterweight support arm 90. Counterweight mass 94 includes a body 96, an aperture 98 and a counterweight set screw 100. Aperture 98 extends through body 96 for slidably receiving counterweight support arm 90. Counterweight set screw 100 extends through body 96 to engage counterweight support arm 90 within aperture 98. Counterweight mass 94 can be repositioned along counterweight support arm 90 in the direction of arrows 102 by loosening set screw 100. When counterweight mass 94 is in the desired position, set screw 100 can be tightened to engage counterweight support arm 90 and thereby lock counterweight mass 94 in the desired position.

Counterweight mass 94 and counterweight support arm 90 can have any suitable cross section such as circular or rectangular. Set screw 100 can be replaced with any suitable device or locking mechanism that releasably engages mass 94 to support arm 90. Support arm 90 can extend through aperture 98 or can be secured to mass 94 along an exterior of mass 94. Various other configurations can also be used, provided that the configuration allows the position of mass 94 to be adjusted with respect to pivot 52.

Roller displacement sensor 70 is also shown in greater detail in FIG. 3. As mentioned above, target 72 includes guide shaft 78 which extends through guide support structure 76. Guide shaft 78 is movable with respect to guide support structure 76 in response to vertical displacements of sensing roller 34. Displacement surface 82 is attached to a first end 86 of guide shaft 78. In one embodiment, displacement surface 82 is a disk attached to first end 86. Displacement surface 82 engages axle 40 of sensing roller 34. In alternative embodiments, displacement surface 82 engages one or more disks 42 of sensing roller 34 or engages support arm 48. Displacement surface 82 preferably has a width that is at least as great as a maximum horizontal displacement of sensing roller 34 such that axle 40 does not travel beyond the outer edges of displacement surface 82.

Target surface 80 is attached to a second end 88 of guide shaft 78. In one embodiment, target surface 80 includes a disk similar to disk 82. Target surface 80 faces distance measuring transducer 74. Target surface 80 and distance measuring transducer 74 are separated by a measurement gap 120. Measurement gap 120 has a length which is a function of the vertical displacement of sensing roller 34 which, in turn, is a function of the tension in dough sheet 38.

In the embodiment shown in FIG. 3, roller displacement sensor 70 is arranged to measure vertical displacements of sensing roller 34. Since sensing roller 34 travels along arc 58 with respect to pivot 52, sensing roller 34 has a vertical displacement and a horizontal displacement. Therefore, roller displacement sensor 70 can be arranged to sense vertical displacements, horizontal displacements or a combination of both. With the horizontal arrangement, guide shaft 78 would extend in a horizontal direction from axle 40 and would require a connection that would bias displacement surface 82 against axle 40 or another element of the sensing roller or the support arm.

Transducer 74 can include any non-contact distance measuring transducer which is capable of measuring the length of gap 120 through the atmosphere. In one embodiment, transducer 74 includes an ultrasonic transducer having a transmitter and receiver 122. Transducer 74 directs ultrasonic signals 124 toward target surface 80. Ultrasonic signals 124 are reflected off of target surface 80 and received by transducer 74. The travel time of ultrasonic signals 124 across gap 120 is a function of the length of gap 120. Transducer 74 measures the travel time by measuring a time delay between the transmitted signal and the received signal in a known manner.

Transducer 74 converts the time delay into an electrical analog or digital signal which is transmitted through electrical output 126. In one embodiment, electrical output 126 is a 4–20 mA current loop. Transducer 74 controls the magnitude of current flowing through loop 126 as a function of the measured time delay, i.e. the tension in dough sheet 38. A remote device (not shown) senses the current flowing through current loop 126 and automatically controls a physical parameter of dough production line equipment 10 as a function of the sensed current or provides a visual output indicative of the tension to an operator for analysis.

Roller displacement sensor 70 can have various configurations of transmitters, receivers and reflectors in accordance with the present invention. For example, the transmitter and receiver 122 can be secured to target surface 80 as opposed to an upper support flange 128. In this embodiment, ultrasonic signals 124 would be reflected off of upper support flange 128 and received at target surface 80. In another embodiment, the transmitter and receiver elements are separated and mounted on either side of gap 120. An example of a suitable ultrasonic sensor is a SUPERPROX® Proximity Sensor available from Hyde Park Electronics, Inc., of Dayton, Ohio.

Various other types of non-contact distance measuring transducers could also be used in the present invention. For example, the transducer can include an optical transmitter which transmits and receives light signals across gap 120. The optical transmitter includes a light source such as an incandescent lamp, light emitting diode or laser diode, while the receiver includes a photodetector. In this embodiment, a phase change in the light signals is indicative of the gap length. Other devices which transmit and receive electromagnetic radiation can also be used. The distance measuring transducer can include a capacitance sensor which measures the capacitance across the measurement gap. The capacitance would be a function of the gap length. The distance measuring transducer can also include a magnetoresistive sensor in which a magnet and a magnetoresistive element are separated by the measurement gap. The resistance of the magnetoresistive element would be a function of the gap length.

The dough sheet tension sensor of the present invention eliminates the mechanical and measurement difficulties of tension sensors of the prior art. The adjustable counterweight eliminates the non-linear properties which are associated with the use of counter balance springs. This makes tension measurements much less complex and more accurate. In addition, the adjustable counterweight is simple to manufacture and more easily adjustable than a counter balance spring. Likewise, the displacement sensor has few moving mechanical parts and is therefore much less susceptible to wear and fatigue. The only movable part is a light-weight guide shaft which slides up and down within a guide support. The remaining elements of the displacement sensor are electronic and have no moving parts. As a result, the displacement sensor is much more reliable than the sensors of the prior art. In addition, the transducer components of the displacement sensor are commercially available at a relatively low cost.

Although the present invention has been described with reference to preferred embodiments, workers skilled in the art will recognize that changes may be made in form and detail without departing from the spirit and scope of the invention.

What is claimed is:

1. A dough sheet sensor for sensing droop of a dough sheet within a gap of a dough production line, the sensor comprising:

a pivot;

a sensing roller for contacting the dough sheet within the gap;

a roller support arm supporting the sensing roller and attached to the pivot such that the sensing roller is displaceable in a first direction with respect to the pivot in response to the droop of the dough sheet within the gap;

an adjustable counterweight attached to the roller support arm and positioned opposite to the pivot with reject to the sensing roller for counterbalancing the sensing roller; and a displacement sensor coupled to the sensing roller and having a sensor output which is a function of the displacement of the sensing roller in the first direction.

2. The dough sheet sensor of claim 1 wherein the adjustable counterweight comprises:

a counterweight support arm having a proximal end attached to the roller support arm; and a counterweight mass slidably connected along the counterweight support arm.

3. The dough sheet sensor of claim 2 wherein the counterweight mass comprises:

a body;

an aperture through the body which receives the counterweight support arm; and a counterweight set screw extending through the body and engaging the counterweight support arm within the aperture.

4. The dough sheet sensor of claim 1 wherein:

the sensing roller comprises first and second ends;

the roller support arm comprises first and second roller support arms which support the first and second ends, respectively; and the adjustable counterweight comprises first and second adjustable counterweights attached to the first and second support arms, respectively.

5. The dough sheet sensor of claim 4 and further comprising an interconnecting rod extending between the first and second roller support arms.

6. The dough sheet sensing roller of claim 1 wherein the displacement sensor comprises an ultrasonic distance sensor.

7. A dough sheet sensor, comprising:

a support structure;

a sensing roller displaceable in a first direction with respect to the support structure; and a non-contact distance sensor operably coupled to the sensing roller through a measurement gap, wherein measurement gap has a length that varies with the sensing roller displacement and the distance sensor has a measurement output which is a function of the length.

8. The dough sheet sensor of claim 7 wherein the distance sensor is arranged with respect to the sensing roller and the support structure such that the measurement gap has a length that varies with vertical displacement of the sensing roller.

9. The dough sheet sensor of claim 7 wherein the distance sensor is arranged with respect to the sensing roller and the support structure such that the measurement gap has a length that varies with horizontal displacement of the sensing roller.

10. The dough sheet sensor of claim 7 wherein the distance sensor comprises:
   a target engaging the sensing roller, which is displaceable in the first direction with displacements of the sensing roller in the first direction; and
   a distance measuring transducer attached to the support structure such that the transducer faces the target and is separated from the target by the measurement gap.

11. The dough sheet sensor of claim 10 wherein the distance measuring transducer includes an ultrasonic transmitter and receiver which are attached to the support structure and wherein the target includes an ultrasonic reflective surface.

12. The dough sheet sensor of claim 10 wherein the distance measuring transducer includes an ultrasonic transmitter attached to one of the support structure and the target and includes an ultrasonic receiver attached to the other of the other of the support structure and the target.

13. The dough sheet sensor of claim 10 wherein the distance measuring transducer includes an optical distance measuring transducer.

14. The dough sheet sensor of claim 10 wherein the target comprises:
   a guide shaft with first and second ends;
   a displacement surface supported at the first end and engaging the sensing roller; and
   a target surface supported at the second end and facing the transducer.

15. The dough sheet sensor of claim 14 wherein the distance sensor further comprises:
   a guide support attached to the support structure and having a guide aperture extending therethrough in the first direction; and
   wherein the guide shaft extends through the guide aperture.

16. The dough sheet sensor of claim 14 wherein the displacement surface has a width that is at least as great as a maximum displacement of the sensing roller in a second direction which is generally perpendicular to the first direction.

17. The dough sheet sensor of claim 7 and further comprising:
   a pivot attached to the support structure;
   a roller support arm supporting the sensing roller and pivotally attached to the pivot such that the sensing roller is displaceable in the first direction with respect to the pivot; and
   an adjustable counterweight attached to the roller support arm and positioned opposite to the pivot with respect to the sensing roller.

18. The dough sheet sensor of claim 17 wherein the adjustable counterweight comprises:
   a counterweight support arm having a proximal end attached to the roller support arm; and
   a counterweight mass slidably connected along the counterweight support arm.

19. The dough sheet sensor of claim 18 wherein the counterweight mass comprises:
   a body;
   a aperture through the body which receives the counterweight support arm; and
   a counterweight set screw extending through the body and engaging the counterweight support arm within the aperture.

20. A dough sheet sensor, comprising:
   a pivot;
   a sensing roller displaceable along an arc about the pivot;
   a roller support arm supporting the sensor roller and attached to the pivot;
   a counterweight support arm having a proximal end attached to the roller support arm;
   a counterweight mass slidably connected along the counterweight support arm; and
   a non-contact distance sensor operably coupled to the sensing roller, and comprising a measurement gap having a length that varies with the sensing roller displacement, an ultrasonic transducer positioned adjacent the gap for measuring the gap length, and an output which is a function of the measured length.

* * * * *